(12) United States Patent
Clemm et al.

(10) Patent No.: US 12,047,477 B2
(45) Date of Patent: Jul. 23, 2024

(54) PACKET-PROGRAMMABLE STATELETS

(71) Applicant: Huawei Technologies Co., Ltd., Shenzhen (CN)

(72) Inventors: Alexander Clemm, Los Gatos, CA (US); Uma S. Chunduri, Fremont, CA (US); Renwei Li, Sunnyvale, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 564 days.

(21) Appl. No.: 17/008,347

(22) Filed: Aug. 31, 2020

(65) Prior Publication Data

US 2020/0396320 A1 Dec. 17, 2020

Related U.S. Application Data

(63) Continuation of application No. PCT/US2019/019809, filed on Feb. 27, 2019.
(Continued)

(51) Int. Cl.
*H04L 29/06* (2006.01)
*H04L 45/74* (2022.01)
(Continued)

(52) U.S. Cl.
CPC .............. *H04L 69/22* (2013.01); *H04L 45/74* (2013.01); *G06F 3/061* (2013.01); *G06F 3/0659* (2013.01); *G06F 3/067* (2013.01)

(58) Field of Classification Search
CPC ....... H04L 43/106; H04L 45/38; H04L 45/70; H04L 47/10; H04L 47/24; H04L 47/2466;
(Continued)

(56) References Cited

U.S. PATENT DOCUMENTS 7,191,290 B1 * 3/2007 Ackaouy ............. G06F 16/9574
711/119
7,613,209 B1 11/2009 Nguyen et al.
(Continued)

FOREIGN PATENT DOCUMENTS

CN 101217501 A 7/2008
CN 102104541 A 6/2011
(Continued)

OTHER PUBLICATIONS

NetScope: traffic engineering for IP networks A. Feldmann; A. Greenberg; C. Lund; IEEE Network Year: 2000 | vol. 14, Issue: 2 | Magazine Article | Publisher: IEEE Cited by: Papers (124) | Patents (16) (Year: 2000).*
(Continued)

*Primary Examiner* — Chirag R Patel
(74) *Attorney, Agent, or Firm* — Schwegman Lundberg & Woessner, P.A.

(57) ABSTRACT

A network device includes a statelet storage storing statelets that retain state information associated with a packet flow through the network device and that the network device can interact with to control processing performed on packets of the data flow. The network device implements a set of instructions that interpret commands in the data packets to manage and interact with statelets. The statelets in the statelet storage are organized by a statelet key that is derived from information identifying the packet flow. Responsive to the commands in the packets, the network device can create, read, write, or delete statelets from the statelet storage. The statelet storage includes multiple statelets each statelet including multiple fields. The network device may access the statelets to control/monitor a packet flow using information in a network data plane without receiving control information from a network control plane.

20 Claims, 8 Drawing Sheets

Related U.S. Application Data

(60) Provisional application No. 62/637,111, filed on Mar. 1, 2018.

(51) Int. Cl.
*H04L 69/22* (2022.01)
*G06F 3/06* (2006.01)

(58) Field of Classification Search
CPC ..... H04L 47/2483; H04L 47/28; H04L 47/35; H04L 47/41; H04L 69/22; H04L 69/28; H04L 43/026; H04L 67/5681; H04L 67/568; H04L 45/02; H04L 45/036; H04L 45/74; G06F 12/0862
USPC ....................................................... 709/238
See application file for complete search history.

(56) References Cited

U.S. PATENT DOCUMENTS

| | | | |
|---|---|---|---|
| 8,767,757 | B1 | 7/2014 | Chudgar et al. |
| 9,608,913 | B1 | 3/2017 | Kabbani et al. |
| 10,097,464 | B1* | 10/2018 | Conlon ................. H04L 47/125 |
| 10,375,155 | B1* | 8/2019 | Cai ..................... H04L 41/0896 |
| 2005/0025151 | A1 | 2/2005 | Alcatel |
| 2008/0228772 | A1* | 9/2008 | Plamondon ......... G06F 16/9574 |
| 2013/0003549 | A1* | 1/2013 | Matthews ........... H04L 41/0668 370/235 |
| 2013/0163427 | A1* | 6/2013 | Beliveau ............. H04L 47/2441 370/235 |
| 2017/0034082 | A1* | 2/2017 | Pfaff ....................... H04L 69/22 |
| 2017/0111465 | A1* | 4/2017 | Yellin .................. H04L 67/568 |
| 2019/0081904 | A1* | 3/2019 | Bohrer .................... H04L 47/20 |
| 2019/0149516 | A1* | 5/2019 | Rajahalme .......... H04L 63/0254 370/392 |

FOREIGN PATENT DOCUMENTS

| | | | | |
|---|---|---|---|---|
| CN | 104243204 A | | 12/2014 | |
| WO | WO-2010023646 A2 | * | 3/2010 | ............. H04L 69/22 |
| WO | WO-2017040706 A1 | | 3/2017 | |
| WO | WO-2019168965 A1 | | 9/2019 | |

OTHER PUBLICATIONS

NetScope: traffic engineering for IP networks A. Feldmann; A. Greenberg; C. Lund; IEEE Network Year: 2000 | vol. 14, Issue: 2 | Magazine Article | Publisher: IEEE Cited by: Papers (124) | Patents (16) (Year: 2000) (Year: 2000).*

"International Application Serial No. PCT/US2019/019809, International Search Report mailed May 21, 2019", 4 pgs.

"International Application Serial No. PCT/US2019/019809, Written Opinion mailed May 21, 2019", 6 pgs.

"Chinese Application No. 201980015295.0, First Office Action mailed Mar. 3, 2021", (Mar. 3, 2021), 22 pgs.

"European Application No. 19710898.8, Communication pursuant to Article 94(3) EPC dated Jun. 23, 2023", (Jun. 23, 2023), 5 pgs.

"Chinese Application No. 201980015295.0, Notice of Allowance mailed Oct. 29, 2021", (Oct. 29, 2021), 4 pgs.

* cited by examiner

PACKET-PROGRAMMABLE STATELETS

CROSS-REFERENCE TO RELATED APPLICATIONS

This application is a continuation application of International Application No. PCT/US2019/019809, filed 27 Feb. 2019, which claims the benefit of priority to U.S. Provisional Patent Application No. 62/637,111, filed 1 Mar. 2018, titled "Packet-Programmable Statelets," the benefit of priority of each of which is claimed herein, and which applications and publication are hereby incorporated herein by reference in their entirety.

TECHNICAL FIELD

This application is directed to computer networks and, more particularly, to a system and method for using self-driving packets to access statelets stored in a network device monitor and control the state of a network.

BACKGROUND

Many networking applications involve a concept of state, and some applications can benefit from the ability to maintain certain state or context about a flow in the network. For example, applications with high-performance demands may want to reserve network resources—those reservations constitute network state for the communication flows for which they are made. The same applications may establish service level objectives for a given flow. When the end-to-end service level objectives can get decomposed into component service level objectives, including component service level objectives that apply to individual hops, data on the decomposed objectives may constitute network state. Alternatively, the end-to-end service level objectives and the component service level objectives can be maintained by an external system. An application may also want to measure and validate service levels of production flows, which may use context about prior packets and custom flow statistics observed on devices in the network.

Addressing such features today requires custom-built protocols such as the Resource Reservation Protocol (RSVP) (to manage reservations), the Two-Way Active Measurement Protocol (TWAMP) (to conduct active, but not passive measurements), or the Internet Protocol Flow Information Export (Netflow/IPFIX) (to collect certain flow statistics). Adding new features to these protocols may involve lengthy standardization and product cycles. Furthermore, these protocols are implemented in the control plane of networks having both a data plane and a control plane.

Self-driving packets with conditional commands provide an alternative for controlling packet flow in conventional packet networks. Such self-driving packets provide greater control over how packets are to be processed. This control may be implemented in applications and gateways at the edge of the network.

SUMMARY

The examples below describe efficient mechanism, techniques, and/or concepts for controlling and/or monitoring data flows in a network using statelets for the data flows distributed across a network in network devices. A statelet may contain data for a particular data flow, such as, without limitation, freshness information (e.g., a start time), a source address, a destination address, a number of packets transmitted, an amount of data transmitted in the flow, and/or other statistical information related to the data flow. The packets of the data flow include commands which interact with the statelet data for the data flow. These commands may be conditional and may be used to collect statistical data for the data flow and/or to control the routing of packets belonging to the data flow. Thus, monitoring and control of the data flow is not limited to the edge nodes but may occur at any node in the network and may occur independently of a central control node.

These examples are encompassed by the features of the independent claims. Further embodiments are apparent from the dependent claims, the description and the figures.

Embodiments include a network device having a statelet store and a processor configured to execute commands in packet headers of a data flow. The commands access a statelet for the data flow from the statelet store of the network device in order to control the data flow.

According to a first aspect, a method for processing a data flow in a network device including a statelet storage parses a first packet of a data flow to extract a first command and flow information identifying the data flow from a first header of the first packet. The method generates a first statelet key from the extracted flow information and executes the first command to access a first statelet associated with the first statelet key. The first statelet is stored in the statelet storage of the network device.

In a first implementation form of the method according to the first aspect as such, the method creates the first statelet in the statelet storage of the network device. The first statelet has a key field including the first statelet key. The method stores a first freshness value in a freshness field of the first statelet. The first freshness value indicates a time at which the first statelet is created.

In a second implementation form of the method according to the first aspect as such, the method parses a second packet of the data flow to extract a second command and the flow information identifying the data flow from a second header of the second packet. The method generates the first statelet key from the flow information extracted from the second header of the second packet. Responsive to the second command, the method accesses the first statelet having the first statelet key. The method accesses the first statelet to perform at least one of the following operations: read a field value from the first statelet, write a field value to the first statelet, modify a value in a field of the first statelet, add a value to a list in the first statelet, or remove a value from a list in the first statelet. The method stores a second freshness value in the freshness field of the first statelet, where the second freshness value indicates a time at which the first statelet is accessed responsive to the second command.

In a third implementation form of the method according to the first aspect as such, of the method as such, the method accesses the first statelet responsive to the second command to reading a field value from the first statelet and controls processing of the second packet by the network device responsive to the field value read from the first statelet.

In a fourth implementation form of the method according to the first aspect as such, the statelet storage includes a plurality of statelets. The method compares respective freshness values in the freshness fields of each of the plurality of statelets to a current time value. When a difference between the current time value and the freshness value in the freshness field of one of the statelets is greater than a threshold value, the method reclaims any memory occupied by the one statelet.

In a fifth implementation form of the method according to the first aspect, the method writes a data value into a field of the first statelet responsive to metadata in the first header of the first packet.

In a sixth implementation form of the method according to the first aspect, the method increments a value in a field of the first statelet.

In a seventh implementation form of the method according to the first aspect, the method deletes the first statelet from the statelet storage of the network device.

In an eighth implementation form of the method according to the first aspect, the method combines N values from the flow information to generate the first statelet key. In executing the first command, the method selects the first statelet responsive to the first statelet key including M values of the N values in the first statelet key, where M is less than N.

In a ninth implementation form of the method according to the first aspect, the first command includes a statelet key mask and the method selects the M values used to match with the statelet key responsive to the statelet key mask.

In a tenth implementation form according to the method of the first aspect, the parsing of the first packet includes extracting the first command and a second command from the first header of the first packet. The method executes the first command, which includes testing a condition, to produce a result. The method then conditionally executes the second command responsive to the result produced by the first command.

According to a first aspect, an apparatus in a network device includes a memory having statelet storage and computer program instructions. A processor in the apparatus is coupled to the memory. The computer program instructions cause the processor to parse a first packet of a data flow to extract a first command and flow information identifying the data flow from a first header of the first packet. The instructions further configure the processor to generate a first statelet key from the extracted flow information, and to execute the first command to access a first statelet associated with the first statelet key, the first statelet being stored in the statelet storage.

In a first implementation form of the apparatus according to the second aspect as such, the processor creates the first statelet in the statelet storage of the network device. The first statelet has a key field that includes the first statelet key. The apparatus stores a first freshness value in a freshness field of the first statelet. The first freshness value indicates a time at which the first statelet is created.

In a second implementation form of the apparatus according to the second aspect as such, the processor parses a second packet of the data flow to extract a second command and to extract the flow information identifying the data flow from a second header of the second packet. The processor generates the first statelet key from the flow information extracted from the second header. The processor accesses the first statelet and executes the second command the second command causes the processor to at perform at least one of the following operations: read a field value from the first statelet, write a field value to the first statelet, modify a value in a field of the first statelet, add a value to a list in the first statelet, or remove a value from a list in the first statelet. The processor stores a second freshness value in the freshness field of the first statelet. The second freshness value indicates a time at which the first statelet is accessed responsive to the second command.

In a third implementation form of the apparatus according to the second aspect as such, the processor writes a data value into a field of the first statelet responsive to metadata in a header of the first packet.

In a fourth implementation form of the apparatus according to the second aspect as such, the processor deletes the first statelet from the statelet storage of the network device.

In a fifth implementation form of the apparatus according to the second aspect as such, the processor combines N values from the flow information to generate the first statelet key. The processor then select the first statelet responsive to the a statelet key of the statelet including M values of the N values in the first statelet key, where M is less than N.

In a sixth implementation form of the apparatus according to the second aspect as such, the command includes a statelet key mask and processor selects the M values responsive to the statelet key mask.

In a seventh implementation form of the apparatus according to the second aspect as such, the processor extracts the first command and a second command from the first header of the first packet. The processor executes the first command to test a condition which produces a result based on data in the first statelet. The processor conditionally executes the second command responsive to the result produced by the first command.

According to a third aspect, a non-transitory computer-readable medium holds computer instructions for processing a data flow in a network device. The computer instructions, when executed by a processor configure the processor to parse a first packet of a data flow to extract a first command and flow information identifying the data flow from a first header of the first packet. The instructions further configure the processor to generate a first statelet key from the extracted flow information and to execute the first command to access a first statelet associated with the first statelet key. The first statelet is stored in a statelet storage of the network device.

The methods described above can be performed by the apparatus. Further features of these methods directly result from the functionality of the apparatus.

The explanations provided for each of the first through third aspects and their implementation forms apply equally to other ones of the first through third aspects and the corresponding implementation forms. The various aspects and implementation forms may be combined on a single network device or used across multiple network devices.

Portions of the described embodiments can be implemented in hardware, software or in any combination thereof.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

It should be understood at the outset that although an illustrative implementation of one or more embodiments are provided below, the disclosed systems and/or methods described with respect to FIGS. 1-8 may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
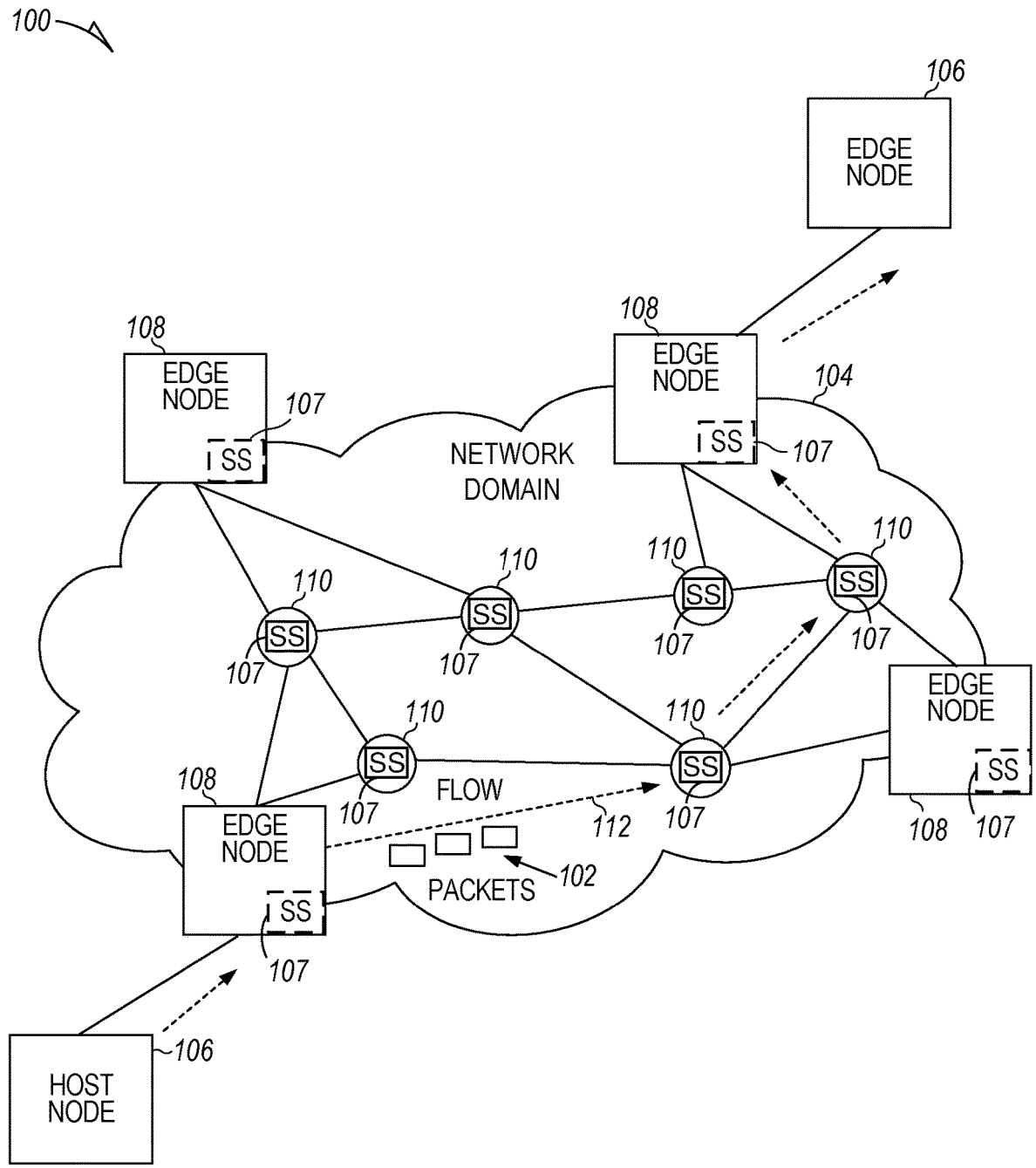
FIG. 1 is a schematic diagram of an example network for routing data packets with conditional commands according to an example embodiment.

FIG. 1 is a schematic diagram of an example network 100 for routing data packets 102 with conditional commands that may interact with statelets on the network nodes. As used in the example embodiments, a statelet is a partial state of a flow that is retained at a network device for the flow. The statelet is associated with flow via a statelet key, analogous to a flow key of a flow cache. The statelet key contains information that is carried in packet headers, such as fields that identify the source and destination address. In example embodiments, statelets are stored in a statelet store of a network device. The statelet store is, for example, similar to a cache memory that is addressed by the statelet key of the statelet. An example statelet key corresponds to a 7-tuple Netflow flow key. The example 7-tuple comprises: 1) source IP address, 2) source port ID, 3) destination IP address, 4) destination port ID, 5) Simple Network Management Protocol (SNMP) interface index (ifIndex) of the ingress interface, 6) Type of Service (ToS), and 7) application IP protocol.

The network 100 includes a network domain 104 including host nodes 106. The network domain 100 includes edge nodes 108 that act as ingress and egress points and internal nodes 110 which communicate data, such as a data flow 112 of data packets 102. Each edge node 108 and internal node 110 in the example network 100 includes a statelet storage 107. Also, the host nodes 106 may be connected to edge nodes 108 on 2 g/3 g/4 g/5 g radio. In that case, edge node 108 may be a router connected to the base station on the mobile phone network (Evolved Node B (eNB)).

In the example network, host nodes 106 are nodes that execute applications and wish to communicate with other host nodes 106. Such host nodes 106 may communicate by transmitting data flows 112 via the network domain 104. A data flow 112 is a group of related communications between a common set of end points, such as host nodes 106. For example, applications operating on the host nodes 106 can initiate a communication session. The data exchanged during the communication session may be transmitted as a data flow 112. The data in the data flow 112 is separated into data packets 102 for transmission. A data packet 102 includes a header with routing information and a payload with the data exchanged between the host nodes 106 (e.g., as part of the communication session.) The payload may be encrypted in some cases and may not be readable by the network domain 104 connecting the host nodes 106.

Although the example network 100 shows a single data flow 112, multiple data flows 112 may be transferred through the network either concurrently or over time. Each data flow 112 may be assigned a path through the network domain 104 by one of the edge nodes 108. In addition to the path, each data flow 112 may subject to a service level agreement (SLA) according to which, the data flow 112 must meet service level guarantees and achieve defined service level objectives (SLOs).

Network domain 104 includes a group of interconnected network components controlled by a common set of networking policies. It should be noted that, while network domain 104 is a single domain, the present disclosure may be deployed in a multi-domain context. The edge nodes 108 are network devices that encapsulate packets or modify packet headers to facilitate processing of the packets as they are transferred through the network. For example, the packet headers may be modified to include additional information such tunneling information, QoS policies, network address translation functions and/or commands that facilitate guiding the packet through the network. The edge nodes 108, however, do not modify the packet payload or the packet header if the edge node encapsulates the packet. For example, the edge nodes 108 may implement security policies for the network domain 104, change network addresses of the data packet 102 according to network domain 104 addressing schemes, manage the data flow 112 through the network domain 104 based on the state of the network as maintained in the statelet storages 107 of the network nodes 108 and 110. Hence, the edge nodes 108 act as ingress and egress points into the network domain 104. As a particular example, the edge nodes 108 may determine path(s) across the network domain 104, encapsulate the packets 102 to cause the packets 102 to proceed through the network domain 104 via tunnels. In addition, the encapsulated packets may include conditional commands that create, delete, and/or interact with state data in the statelet storages 107 to generate and/or monitor network performance data at the level of a single data flow 112 or multiple data flows 112.

The edge nodes 108 are interconnected by a series of internal nodes 110 and corresponding links, depicted as lines between pairs of the nodes 108 and 110. The internal nodes 110 are network devices, such as routers, that are configured to read data packet 102 header information and to process and forward the data packets 102 according to the header information. Each internal node 110 in the example network domain 104 also includes a statelet storage 107. In other examples, there may be some internal nodes 110 that do not include statelet storages 107. The edge nodes 108 and/or the internal nodes 110 may identify data flows 112 and determine that packets 102 and corresponding context information are associated with a corresponding data flow 112. For example, a data flow 112 can be identified by a tuple containing several key parameters, such as, without limitation, source Internet Protocol (IP) address and source port, destination IP address and destination port, SLA, and input interface. In other cases, data flow 112 can be identified by a flow specifier.

An example statelet storage 107 may contain one or more statelets each associated with a data flow 112 and/or a group of aggregated data flows 112 traversing the node containing the statelet storage 107. As described above, an individual flow is identified by a flow key, for example, by the Netflow V5 7-tuple, described above. An aggregated flow is a flow having a flow key that includes only a subset of the possible key fields. Such a flow "aggregates" all flows that share the same values for the subset of key fields but have different values for fields not in the subset. Accordingly, a packet is part of its flow, as well as of all aggregated flows having a subset of its key fields.

The statelet entry may contain data for a particular data flow 112 such as freshness information (e.g., a start time), a source address, a destination address, a number of packets 102 transmitted, an amount of data transmitted in the flow 112, and/or other statistical information related to the data flow 112.

In example embodiments, the network domain 104 can be modified using conditional commands to route the data packets 102 and, using the statelet entries. Such conditional commands may also be employed to manage other actions related to a data flow 112 such as, without limitation, updating context of a data flow 112, directing maintenance of statistics related to the data flow 112, updating metadata and headers of packets 102. Hence, by maintaining data in, and retrieving data from the statelet storages 107, the conditional commands allow the packets 102 to monitor and store at least a portion of the state of each flow that traverses node 108 and 110 in the network domain 104 and, using this state, direct how the packets 102 of the flow should be routed (e.g., self-driving) and/or how the data flow 112 should be managed. This network control is implemented by the nodes 108 and 110 executing the conditional commands based on metadata in the command and/or on statelet data in the statelet storages 107. A conditional command is positioned in the packet 102 header by the edge node 108 acting as an ingress node (e.g., the head-end node). The conditional command includes a condition, a command, and may also include one or more parameters. The condition indicates an item that must be satisfied before the command is executed. When the condition is not met, the command is ignored. The command indicates an action or actions to be taken by the node processing the data packet 102 upon occurrence of the condition. Also, as will be further explained below, the edge nodes 108 and/or internal nodes 110 may also set bits indicating whether multiple conditional commands inserted into the data packets may be concurrently processed.

In one example, the host node(s) 106 may communicate with the edge node(s) 108 to setup a communication. The host nodes(s) 106 may express communication SLOs to the edge node(s) 108. Alternatively, the communication can be inherent, namely, based on some parameters of the data packet, such as the source IP address. The edge node 108 can determine what kind of treatment a data packet has to be given in the network domain 104 and generate conditional commands accordingly. As described below, statelets may be initialized and/or allocated and maintained on a flow-by-flow basis and the conditional commands in the packets of each data flow 112 may individually interact with the statelet data (e.g., read and or update the statelet data) allowing fine-grained flow control in the data plane. The ingress edge node 108 can then generate a conditional command based on the SLA and/or SLO of the application communication and append the conditional command as a sub-packet in one or more of the data packets 102 of the data flow 112 as such packets 102 enter the network domain 104. In example embodiments, when the data packet 102 is created, a bit is set within the packet to specify whether the conditional command in the sub-packet can be concurrently processed or is dependent upon the processing of other commands. In another example, a network provider may determine to inject conditional commands as sub-packets into the data packets 102 at the edge node(s) 108 without a request from the host node(s) 106. For example, the network provider may determine to add conditional commands to create, modify, and/or delete statelet data in one or more of the nodes 108 and 110 for general network domain 104 maintenance purposes and/or to achieve some goal obtained from other channels, such as from a controller or an Operations Support System (OSS). Using these conditional commands, this control may be implemented entirely in the data plane. Such a network may be implemented without a separate control plane.

The internal nodes 110 obtain the conditional commands from the packets 102 during routing. The internal nodes 110 may store routing commands for the data flow 112. Such routing commands may include commands to generate and/or use data in the statelet storage 107 that is specific to the data 112 and/or general routing commands, such as policies of the network domain 104, IP routing commands, media access control (MAC) routing commands, multiprotocol label switching (MPLS) commands, and/or other routing commands commonly employed for routing packets 102 via a network domain 104. When the condition(s) for the conditional command(s) are met, the internal nodes 110 can execute the associated command(s). Such commands may be complementary commands that are executed in addition to the stored routing commands (e.g., update flow context or change data packet header data) In other cases, the commands may be override commands that are executed instead of the stored routing commands (e.g., drop packet or change next hop) The commands can also create, delete, and/or modify statelet data in the statelet storage 107 of an internal node 110, for example, to increment a counter in a statelet associated with a particular data flow 112 to maintain a count of the packets 102 for the data flow 112 passing through the internal node 110.

The internal nodes 110 may also obtain parameters from the conditional commands. The parameters provide data to clarify the condition(s), the command(s), or both. For example, a condition may include a comparison, such as, without limitation, less than, greater than, equal to, or prefix of. A condition parameter may then contain data indicating a value to support evaluation of the condition. For example, the condition parameter may indicate what value is being compared (e.g., a threshold value to compare an item against or a specific data item to compare against). For example, a conditional command may be used to specify a value X to which another data value is compared. For example, to compare a node address to X, to compare a data packet 102 field (e.g., time to live (TTL) field or next hop prefix) to X, to compare a Transmission Control Protocol (TCP) Keep Alive value to X, to compare a field of an entry in the statelet store 107 to X, to compare the occupancy of a queue to X, where X is a variable set upon creation of the conditional command.

The value X may be set to include many items, such as a data value, reference to a piece of metadata/data carried in the packet 102 and/or a packet header field, a reference to a piece of metadata related to the data flow 112 that is maintained in the statelet storage 107 on a node 108, 110 outside the packet 102, a reference to a well-defined data item, such as, without limitation, a service level objective for the flow which may be stored in a statelet for the flow. The condition and the conditional parameter allow the internal nodes 110 to check a wide range of definable conditions, such as, without limitation, properties of the data packet 102 carrying the conditional command, data flow context, internal node 110 router state (e.g., statelet data), data packet 102 upper layer information (e.g., Open Systems Interconnection (OSI) model layer four and above) node conditions. It should be noted that a condition could be set to always evaluate to true in order to cause the command to execute at each internal node 110 that routes the packet 102. Otherwise, the condition is set to trigger the command only upon the occurrence of the situation desired by the egress edge node 108.

As another example, the command(s) include one or more primitives that are to be applied upon occurrence of the condition. A primitive is a function that is understood by the edge node 108 and/or internal node 110. A command parameter contains data indicating a value that defines a set of operation conditions for the command. For example, the command parameter may indicate what item should be acted upon by the command and/or the extent to which the item should be acted upon/changed. For example, the command may initiate functions at the internal nodes 110 such as, without limitation, packet 102 drop, packet 102 queue, packet 102 priority, update packet 102 field (e.g., mark, add, swap, replace, increment, and/or update field), update context for data flow 112, update packet 102 metadata (e.g., mark, add, swap, replace, increment, and/or update metadata), set data flow 112 next hop, allocate internal node 110 resource, or initiate custom function. The conditional command may also create, read, modify, or delete a statelet in the statelet store 107 that is linked to the data flow 112.

The command parameter may then indicate which data packet 102 queue to employ, which data packet 102 priority to employ, which field to update, and what value to place in such field. As a specific example, a command may indicate that a resource should be allocated at the internal node 110, and parameters may indicate the requested resource type, the resource qualification (e.g., size/amount of allocation), and/or the duration of allocation. Hence, the command and the command parameter allow the internal nodes 110 to execute a wide range of functions.

By executing the command upon occurrence of the condition, a wide range of sophisticated actions can be taken by the internal nodes 110 without prior programming that is particular to the data flow 112. For example, an internal node 110 could raise/lower the priority of a data flow 112 in response to network traffic, preemptively drop packets 102 with high latency, change routing paths for packet(s) of a data flow 112 in response to network traffic, update, swap counter(s)/fields/metadata for packet(s) 102 to provide insight as to conditions at internal nodes 110 along the path, and/or generate/monitor/provide network node statistics. Further, global parameters may also be employed that contain data indicating a value which is global to the header (s) of packet(s) 102. Hence, a global command may affect both the condition and the command as desired.

After being forwarded across the network domain 104, the packets 102 are received by an edge node 108 acting as an egress node for the data flow 112. The edge node 108 can remove and/or process the conditional commands before forwarding the packets 102 to the host node 106 at the data flow 112 destination. For example, the edge node 108 can read the header fields and/or metadata in the data packets 102. The edge node 108 may also report results to the host node(s) 106. For example, the edge node 108 may send reports including data from several packets 102 to indicate that the network domain 104 has complied with one or more SLAs. As another example, the edge node 108 may communicate in real time when the SLA has been breached.

Thus, conditional commands allow for a broad range of functionality to be implemented by a network domain 104 based on in-band signaling that can be tailored on a per data flow 112 and/or even on a per packet 102 basis in response to a current state of the network maintained in the statelet stores 107 of the nodes 108 and 110. Accordingly, conditional commands provide for significant improvement of the functionality, flexibility, and efficiency of the network domain 104. It should also be noted that while an OSI layer three point to point network (e.g., IP network) is shown, conditional commands can be implemented in other network types, such as Open Systems Interconnection (OSI) layer two networks, Software Defined Networks (SDNs), Multiprotocol Label Switching (MPLS) networks, overlay networks like vxLAN or Geneve.

In example embodiments described herein, to mitigate the effects of serial unwrapping of the headers, the headers for data packets 102 to be transmitted in such a network 104 are defined to include a new self-describing packet block with a self-describing block header and multiple sub-blocks with clear demarcation for various functionalities to be done on each router.

As noted above, it is also desirable to provide guidance to intermediate network nodes 110 regarding processing of the packets 102. In example embodiments, Big Packet Protocol (BPP) is based on the idea of injecting meta-information into data packets 102 in order to provide guidance to intermediate network nodes 110 for how to process those data packets 102 and to generate and monitor network state information at each network node 108 and 110. This is done by attaching BPP Blocks with directives that provide guidance for how the data packet 102 should be processed or what resources are to be allocated for a data flow 112, as well as metadata about the data packet 102 and the data flow 112 that the data packet 102 is a part of.

Rather than relying on in-built logic of networking devices that may result in best-effort treatment of the data packet 102, a BPP networking device acts on the commands, metadata, and node status data to handle the data packet 102, overriding any "regular" packet processing logic that is deployed on the device. Commands can be used, for example, to cause each node to monitor its status and store status data into its statelet storage 107 and, based on the current status, control the node 110, for example, to determine when to drop a data packet 102, which queue to use, when to swap a label, to allocate a resource, or to measure a service level and compare it against an SLO. Such a BPP packet is structured as depicted in FIG. 2.

Figure 2:
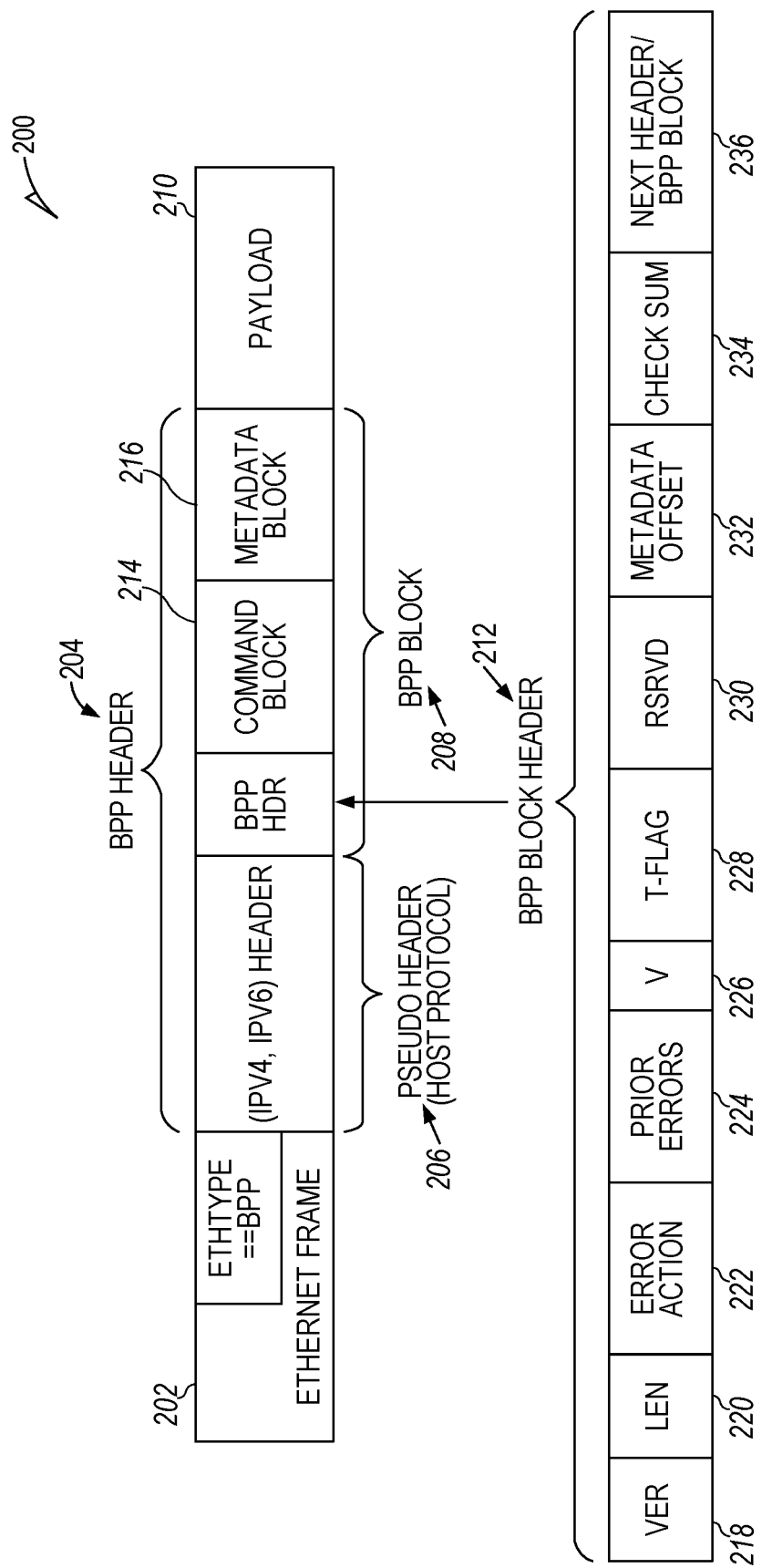
FIG. 2 is a schematic diagram of an example Big Packet Protocol (BPP) header that can be employed to implement a conditional command block in an example embodiment.

FIG. 2 is a schematic diagram of an example Big Packet Protocol (BPP) header 200 that can be employed to implement a sub-packet containing a conditional command block, such as a conditional command block 214, used in a data packet header contained in a data packet 102 in a data flow 112. For example, BPP header 200 may be employed as a specific implementation of a conditional command block 214. It should be noted that the BPP header 200 fields are subject to change due to standardization, and the disclosed field structure is shown to illustrate the concepts included herein. As such, the BPP header 200 fields should not be considered limiting.

As illustrated in FIG. 2, a BPP packet 200 includes an Ethernet frame 202, a payload 210 associated with the ethernet frame, and a BPP header 204 including pseudo-header 206 of the host protocol of the BPP packet 200. This host protocol may be integrated with different host protocols such as, without limitation, NSH, or Geneve. The pseudo-header 206 points to one or more BPP Blocks 208 of BPP header 204 as the next protocol. Other alternatives could be used to carry the same information in existing protocols.

As further illustrated in FIG. 2, the BPP block 208 further includes a BPP block header 212, a command block 214, and a metadata block 216. In example embodiments, the BPP block header 212 may be employed to implement a conditional command set that provides, inter alia, integrated error handling support. For example, the BPP block header 212 may include a version field 218 that contains version information for the BPP block header 212, a length field 220 that indicates a total length (e.g., in bits) of the length of a block (e.g., 16, 32, 128 or more octets depending on the use case), and an error action field 222 that indicates actions to be taken in case of an error. Such actions may include, without limitation, an action to drop the packet, an action to ignore all conditional commands and revert to general processing, an action to ignore the fact that an error has occurred and attempt to continue performing all commands as if nothing has happened.

The BPP block header 212 may also include a prior errors field 224 that may contain data indicating previous errors occurring at previous nodes along the path. In addition, the BPP block header 212 may include an error verbosity field 226, a timing constraint field 228, reserved bits 230, a metadata offset field 232 that indicates a number of bits between the BPP block header 212 and the beginning of metadata encodings, a checksum field 234, and a pointer to the next header/BPP block 236.

Figure 3:
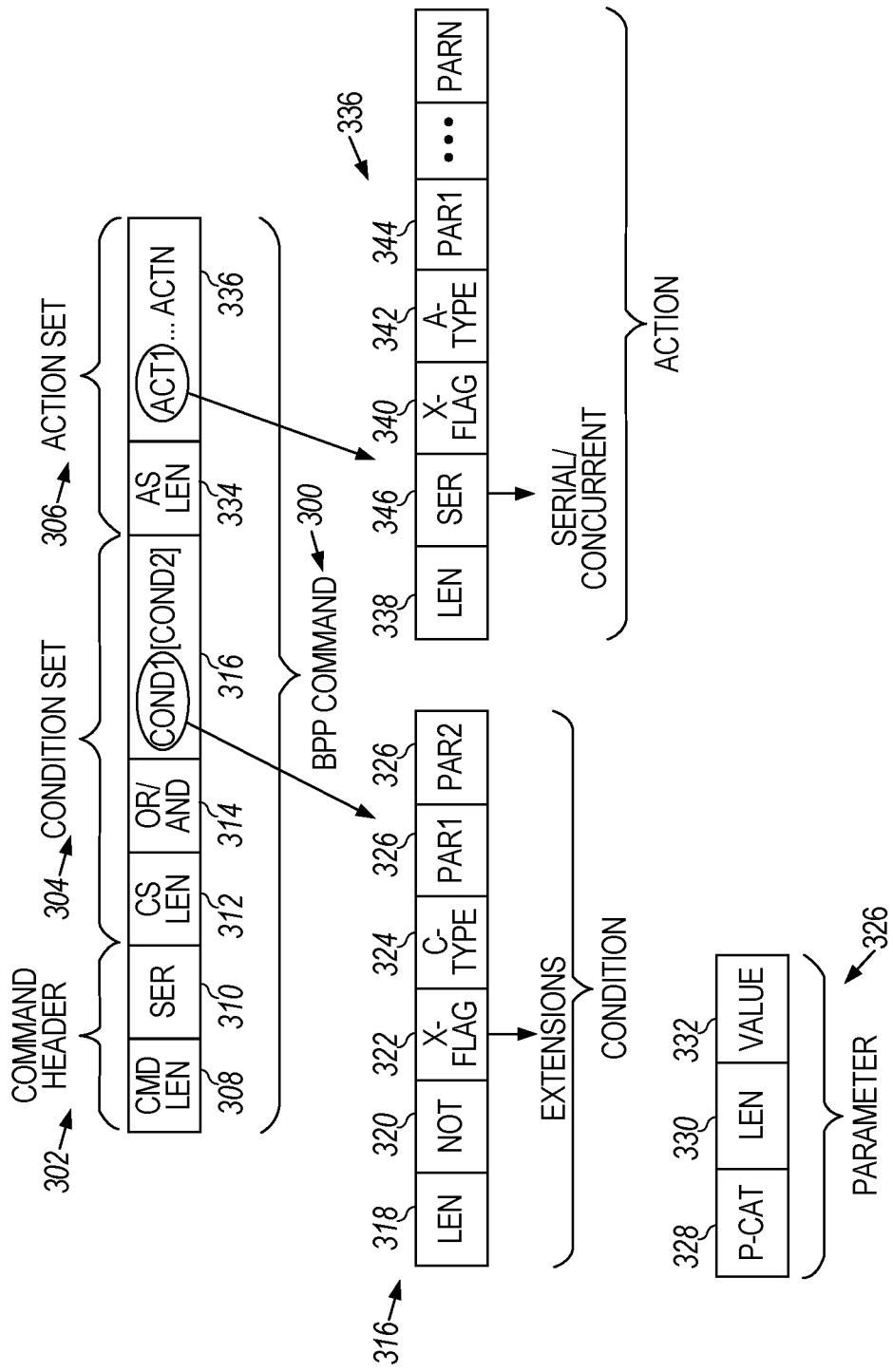
FIG. 3 is a schematic diagram of a BPP command including a BPP block header, a condition set, and an action set in example embodiments.

FIG. 3 shows details of an example BPP command 300 in the BPP command block 214 of the BPP header 204. The BPP command block 214 includes a BPP command 300 with a command header 302, a condition set 304, and an action set 306 that can be employed to implement conditional commands. The condition set 304, includes a condition header 316 having one or more parameters 326. The command header includes a condition set field 308, and a command set field 310, respectively. BPP command block 214 may also include one or more parameters that may implement parameter data fields 326.

As illustrated in FIG. 3, the command header 302 may contain a command length field 308 that indicates the length of the set of conditional commands and/or parameters in the BPP command 300. The command header 302 may also contain various flags containing other administrative data relevant to the BPP command 300. For example, a serial/concurrent flag 310 may be used to indicate whether the conditional command(s) in the BPP command 300 may be processed concurrently with other commands or must be processed serially.

The example condition set 304 may contain a condition set length field 312 that indicates the length and/or number of conditions. The condition set 304 may also contain an "OR/AND" field 314 to indicate whether the conditions should all be satisfied before initiating the commands (AND) or whether the commands should be initiated when any condition is satisfied (OR). The condition set 304 also contains one or more conditions 316. Each condition 316 may include a length field 318 indicating the length of the condition in bits. The conditions 316 may also include a not field 320, which may indicate a negate a Boolean condition. The conditions 316 may also include various flags 322 to further clarify/modify the condition. For example, the flag 322 may provide dynamic extensibility by allowing for proprietary commands and functions and a deployment controlled by an operational framework. The conditions 316 may also include a condition type field 324 to indicate the type of condition to be employed. The conditions 316 may include one or more parameters 326 used by the conditions. The parameters 326 may include a parameter category field 328, a length field 330, and a value field 332 indicating the category of the parameter, the length of the parameter, and the value of the parameter, respectively, in Type-Length-Value (TLV) format. It should be noted that the structure of the example condition set 304 disclosed herein is maintained in TLV format to allow use in conjunction with various metadata parameters under standardization by the Internet Engineering Task Force (IETF), such as, without limitation, Service Function Chaining (SFC) parameters, Network Service Header (NSH) parameters, IP Performance Measurement (IPPM) parameters, In-situ Operations, Administration, and Management (IOAM) parameters.

The example action set 306 may contain an action set length field 334 that indicates the length and/or number of commands. The action set 306 may also contain one or more actions 336 (e.g., commands) that may contain a length field 338 to indicate the length of the action 336. An action 336 may also contain various flags 340 to further clarify/modify the command. The action 336 may also contain an action type field 342 indicating the type of the command. The action 336 may also include one or more parameters 344 used to implement the commands.

In an example embodiment, the flags 340 may include a serial flag 346 the defines whether an action or command may be executed serially or concurrently based on whether or not the command is dependent upon data from another command, for example. State extensions may provide non-blocking options including providing more data about the nature of the commands Updates may occur after the packet is forwarded, and any errors may be indicated in a statelet stored in the statelet storage 107 of the node 108 and/or 110.

Thus, the BPP Command 300 includes a command header 302 that includes the length of the command (selectable from several fixed-size choices) and a flag 346 to indicate if the command needs to be serialized or can be executed in parallel with its preceding command, if any. Actions in the BPP include a set of one or more BPP action primitives along with any parameters. As with conditions, to facilitate extensions, the type of action is indicated by a combination of two fields, A-type (Action Type) 342 and extension (X-) flag 340. Each action comes with a flag 346 that indicates whether it needs to be serialized within the command or whether it can be executed in parallel with the prior action.

Examples of conditional commands that may be concurrently processed include a conditional command that aims at updating a statelet in the statelet storage 107 of the node 108 or 110. For example, a counter may be incremented if the egress current queue length is greater than a certain value. A second conditional command may aim at making a forwarding decision. For example, if the packet length is less than a given value, use queue 1 (ELSE use queue 2). Such conditional commands may be processed concurrently.

On the other hand, an example of conditional commands that should be serialized include a conditional command that aims at deciding whether to drop the packet. For example, the packet is dropped if the hop count is greater than a given value. If the second conditional command aims at updating a statelet in the statelet storage 107 of the node 108 or 110, for example, by incrementing the hop counter, the condition here is "true" even if the packet is dropped. Thus, the commands should be processed serially.

As an example of concurrent actions within a command, a conditional command may specify that if the hop count is greater than a certain value, then: {action 1: increment drop counter in the statelet for the current flow 112 that is stored in the statelet storage 107; compare counter to threshold value; action 2: drop packet/forward to nil queue}.

As described above, BPP utilizes self-driving packets with conditional commands. The protocol also introduces a concept of statelets, i.e. flow state and context about a data flow 112 that is maintained on a network device such as node 108 and/or 110 traversed by the data flow 112. A data flow 112 may be a stream of packets having a common multicast group or a common session identifier (ID). Each node 108, 110 may include a statelet storage 107 that holds the statelets. Statelets can be set-up, used and deleted by the BPP conditional commands to implement network control by interacting with packets of the data flow 112, for example to allow self-driving packets to read data from the statelet to guide how the data flow 112 should be processed. Statelets can be managed using BPP conditional commands. This allows network applications that may involve a concept of state, such as the ones mentioned above, to be developed without dependency on lengthy networking product cycles. In addition, the control may be implemented entirely in the data plane such that the network may be implemented without a control plane.

The statelets that can be managed using commands carried in packets that traverse the network, specifically "self-driving" packets that contain a command block with conditional commands that are executed at forwarding devices as the packet traverses the network (e.g., packets containing BPP conditional commands). Statelets retain "state" for a given data flow 112 at a networking device. That is, they are used to store certain data about the data flow 112 on a device. This data can be read to guide the processing of other packets that belong to the same data flow 112 (e.g., are identified as being in the same session or same multicast group), per the commands carried in those packets. In addition, the data can be modified and written per those commands.

Packet programmable statelets provide a capability to retain and manage the data flow 112 of packets through each node 108, 110 on a per-flow basis and allows the statelets to be managed and programmed by packets of the data flow 112 itself, specifically by "self-driving" packets that contain conditional commands, and allowing those packets and statelets to interact, for example by allowing a conditional command of a packet refer to information that is maintained in the statelet.

To use statelets, example embodiments include a set of conditional commands that allow packets to manage and interact with statelets. These commands are referred to below as "statelet commands" Statelet commands constitute conditional commands that can be carried in an command block of a self-driving packet (e.g., BPP conditional commands, as described above).

The statelet infrastructure on the network device is a memory (e.g., statelet storage 107) in the node 108, 110 that provides a cache or storage to retain statelets, that allows the statelets to be organized by a statelet key (e.g., a data flow 112 identifier in the header of a packet), and that provides system management functions to reclaim memory in the statelet storage 107 when a particular statelet is no longer needed. BPP conditional commands that can interact with the statelet storage 107 in one or more of the nodes 108, 110 provides a statelet execution infrastructure.

Figure 4:
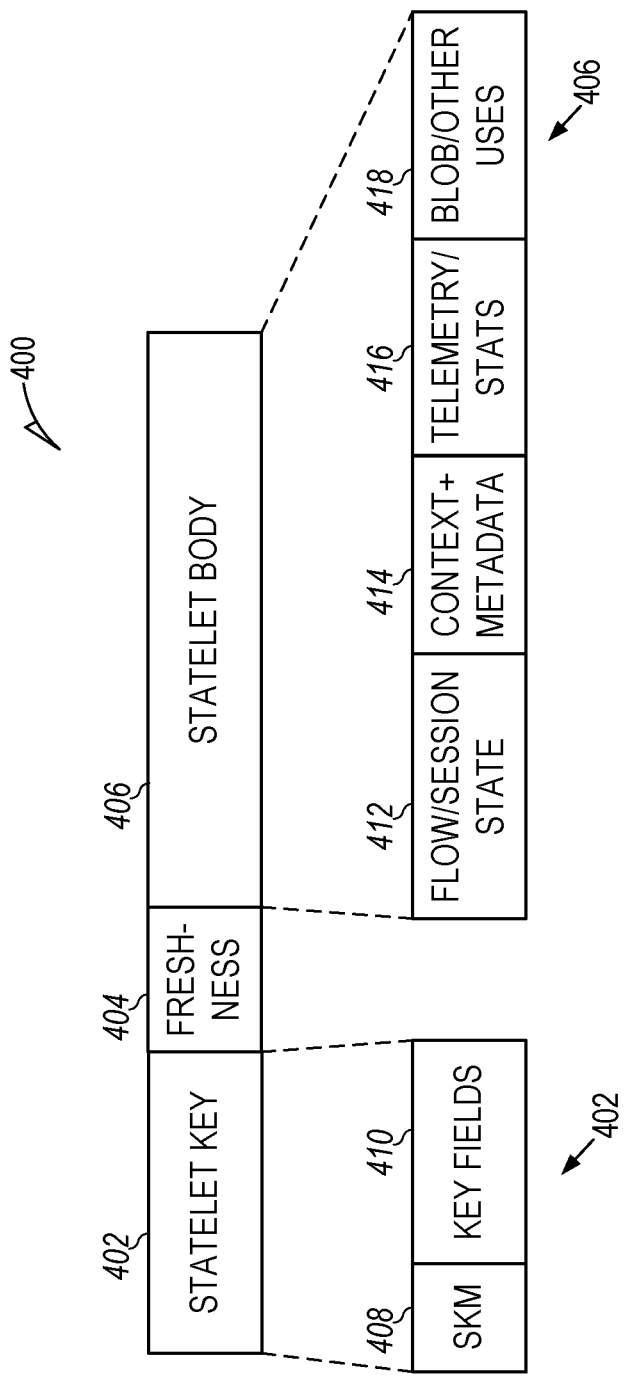
FIG. 4 is a schematic diagram of a statelet according to an example embodiment.

FIG. 4 is a schematic diagram of one example of a statelet 400. It is contemplated that statelets may be configured in many different ways. As shown in FIG. 4, the example statelet 400 includes A statelet key 402 identifying the data flow 112 with which the statelet 400 is associated. The statelet key 402 includes a Statelet Key Mask (SKM) 408 and a set of key index fields 410, as described below. The example statelet 400 also includes an indicator 404 of statelet freshness. The example freshness indicator 404 includes timing information to determine when the statelet 400 should expire. For example, statelet freshness indicator 404 may indicate that a last time a packet with a matching statelet key was processed by the node 108, 110. In this example, the freshness field for a particular data flow 112 is updated with each arriving packet of the data flow 112, reflecting the time the packet was processed.

Alternatively, the freshness field may include a counter which is incremented every time a packet of another data flow 112 is processed and reset when a packet of the data flow 112 corresponding to the statelet 400 is processed. Alternatively, the freshness field may contain an expiration time that is explicitly set, for example by the edge node, and left unchanged unless it is explicitly extended, for example, in response to a condition being satisfied.

The example statelet 400 also includes a statelet body 406. An example statelet body 406 may be treated as an opaque string which is copied from the conditional command into the statelet memory element 400 of the statelet memory. Alternatively, the statelet body 406 may be generated from a set of TLV parameters extracted from the command Another statelet 400 may be encoded as a set of (name, value) pairs or according to a template structure, having a statelet body 406 header identifying the template and containing length information. A statelet may be initialized (e.g., with data carried in metadata fields of the packet), updated (e.g., a value in the statelet may be incremented or replaced with another value) and/or read from.

The example statelet 400 shown in FIG. 4 includes a statelet key 402 that indicates packets of sessions and/or data flows 112 with which a statelet 400 is associated. The statelet key 402 "binds" the packets with their statelet 400. This binding occurs by using a set of packet fields as key fields that need to match, for example, in the same way as flow keys are matched to flow records in the case of Netflow. The binding may be protocol-specific, resulting in slightly different keys if used with IPv4-type packets versus IPv6-type packets, versus layer 2 frames. Just as in Netflow v5, the statelet key 402 may include a 7-tuple, comprising: 1) source IP address, 2) source port ID, 3) destination IP address, 4) destination port ID, 5) Simple Network Management Protocol (SNMP) interface index (ifIndex) of the ingress interface, 6) Type of Service (ToS), and 7) application IP protocol. The particular structure of the key can be indicated using an additional field, SKM (statelet key mask), which can be included as part of the key. An example statelet key mask may include bit field that indicates which key parameters (e.g., from the Netflow 7-tuple described above) are used to compose the key. In other words, the SKM indicates which of the potential key fields actually make up the key. Absence of the SKM may indicate a default index structure, for example, the Netflow 7-tuple, described above. As described above, a statelet key having only as subset of the key fields may be associated with an aggregated set of flows having key fields that match the subset.

The example statelet body 406 can be used to store different categories of data, for example, the state 412 of the data flow 112 or session, context and metadata 414, telemetry data and/or statistics 416 and other user defined data 418. The Session/Flow State field 412 describes the state of a particular data flow 112 or session. This field may be referenced, for example, by conditions in commands for how to process packets for the data flow 112 and/or session. The Context and Metadata field 414 contains user-definable typed data, such as tags, classifiers or other information relevant to a data flow 112 and/or session. The Telemetry/ Statistics field 416 may include programmable counters that can get updated e.g., incremented, decremented, or reset according to BPP conditional commands. The Other Data field 418 is provided to hold other data that a user or administrator may find useful, including unstructured data. It is contemplated that an example statelet body 406 may be divided into further substructures, for example a sub-statelet to maintain statistics and a sub-statelet to store other metadata. A statelet may also store/cache conditional commands to be performed against packets of the corresponding flow or aggregate flow. In addition, as a troubleshooting aid, a statelet can be used to record data about one or more errors encountered while processing packets in the flow.

The example system includes commands that allow packets to manage statelets and allow commands in the packets to interact with the statelets. The commands used to maintain statelets include, without limitation, the commands shown in the following Table.

TABLE

Initialize-statelet (statelet, expiration, SKM):
This command deploys a statelet 400 in the statelet storage 107.
The expiration parameter is optional when there is a default
expiration parameter (e.g., the freshness field 404).
The expiration parameter may indicate a maximum inactivity
period for a data flow 112 before the memory for the statelet
400 is reclaimed. SKM is an optional parameter that allows the
user or administrator qualify the statelet 400 by applying a
mask to the Statelet Key 402. Using the SKM field, a statelet 400
may apply to more than one session or data flow 112. The SKM
field allows a user or administrator to select among different
statelets that may be bound to a packet. Only one statelet 400 may
exist for a given flow/session but multiple flows may access a statelet
400 for one flow through masking via the SKM field. If a command
to deploy a statelet 400 for a session/data flow 112 is received
and a valid statelet 400 for the same session/data flow 112
already exists, the command fails and generates an error
message. The command will also fail and the node 108 or 110
will generate an error message when the statelet storage 107 of
the node 108 or 110 has no more memory, when the node 108
or 110 does not support statelets, and/or when the statelet 400
exceeds a size limit for the node 108 or 110.
Statelet-initialized (SKM):
checks whether or not a statelet 400 for the data
flow 112 already exists and returns a Boolean (true/false).
SKM is an optional parameter used to qualify the statelet 400,
as described above.
Replace-statelet (statelet, expiration, SKM):
Same as "initialize-statelet" but
performed regardless of whether or not a statelet 400 for the
same data flow 112 already exists. Equivalent to an "initialize-
statelet" conditional on a non-initialized statelet 400. SKM is
an optional parameter used to qualify the statelet 400.
Release-statelet (SKM):
Removes the statelet 400 and releases the memory to
the statelet storage 107. SKM is an optional parameter used to
qualify the statelet 400 if needed.
Get (FieldID):
Reads the value of field, or the entire statelet 400 if no field is
specified. Can be also used as parameter for a condition.
Operation fails if there is no such field. The name of the field
can be qualified by SKM if needed.
Set (FieldID, value):
Sets the value of a field, qualified by SKM if needed.
Creates the field if it does not exist already. Details of this
command set may vary. For example, it is conceivable to add
commands to deal with list-valued fields, with those fields
resembling a queue or a stack of values.
Increment (FieldID):
Adds 1 to the value in the identified field.
Increment-by (FieldID, value):
Adds the value parameter to the value in the
identified field.
Decrement (FieldID):
Subtracts 1 from the value in the identified field.

TABLE-continued

Decrement-by (FieldID, value):
subtracts the value parameter from the value in
the identified field.
Get-field-element (FieldID, index-or-top, SKM):
Reads the value of a list,
either the last value or a value per the index. Operation fails if
there is no such field.
Add-value (FieldID, value, SKM):
Adds a value to list. Creates a list-valued
field if it does not exist. Operation fails if there is no memory
(or statelet size limit would be exceeded).
Remove-value (FieldID, SKM):
Removes a value from a list (popping it in case
of a stack, removing the bottom in case of a queue). This
operation fails if there is no such field or if there are no more
values.

In addition to the parameters shown in the table, every statelet command has an implicit parameter, namely the Key Fields of the packet carrying the command Commands can only be applied to the statelet 400 associated with a particular data flow (or aggregated flow) 112, not to statelets of other data flows 112. The statelet to which the command is applied shares the same key as the packet carrying the command (i.e., the statelet key and the command have the same key values). Errors that occur when attempting to execute a statelet command are treated no differently than errors of other commands.

When an error occurs, the node 108 and/or 110 may generate a log entry for the error. Also, the node may flag the occurrence of an error in the packet that carried the failed command so that the host node 106 which receives the packet is notified of the error. When the statelet storage 107 of a node 108 or 110 is full, the node 108 or 110 can no longer allocate new statelets until older ones are removed. The occurrence of this error may cause the node 108 or 110 to analyze each statelet 400 in the statelet storage 107 and reclaim memory used by any statelet 400 having a freshness value 404 indicating that the packet has aged out. Alternatively, the node 108 and/or 110 may periodically analyze the statelets to reclaim statelets that have expired.

A network implementing the conditional statelet commands includes statelet infrastructure on at least some of the nodes 108 and 110. This structure provides a statelet cache, memory, or statelet storage 107 to hold the statelets. An example node 108 or 110 is described below with reference to FIG. 7. In example nodes 108 and/or 110, the statelet storage 107 organizes statelets by their Statelet Keys 402. In some example nodes, the Statelet Keys 402 correspond to the flow key or session ID of the corresponding packets and may be masked, according to the SKM field 408 so that a statelet 400 may be associated with more than one data flow 112 and/or session.

The example nodes also include a set of system management functions. Those system management functions include reclaiming memory or storage of statelets 400 having freshness fields 404 indicating that the statelet 400 has expired. Various expiration mechanisms may be implemented. An example node 108 and/or 110 employs a mechanism that ages statelets out on the basis of flow inactivity. In this example, a recorded time is kept with each statelet 400 indicating the last time the node 108 and/or 110 processed a packet that matches the statelet key. This time is updated with each matching packet. As described above, the node 108 and/or 110 may reclaim memory when the statelet storage 107 is full or periodically on the basis of the difference between the current time and the time recorded with the packet being greater than a threshold value.

Finally, the statelet infrastructure for a node 108 and/or 110 includes the execution infrastructure such as the self-driving packet module 730, described below with reference to FIG. 7, that allows the node 108 and/or 110 to interpret the commands and execute the statelet command that are carried in the packet. The execution infrastructure allows packets to interact only with statelets 400 to which they are bound, that is, having a flow key that matches the Statelet Key 402 with key fields masked by the SKM.

Figure 5:
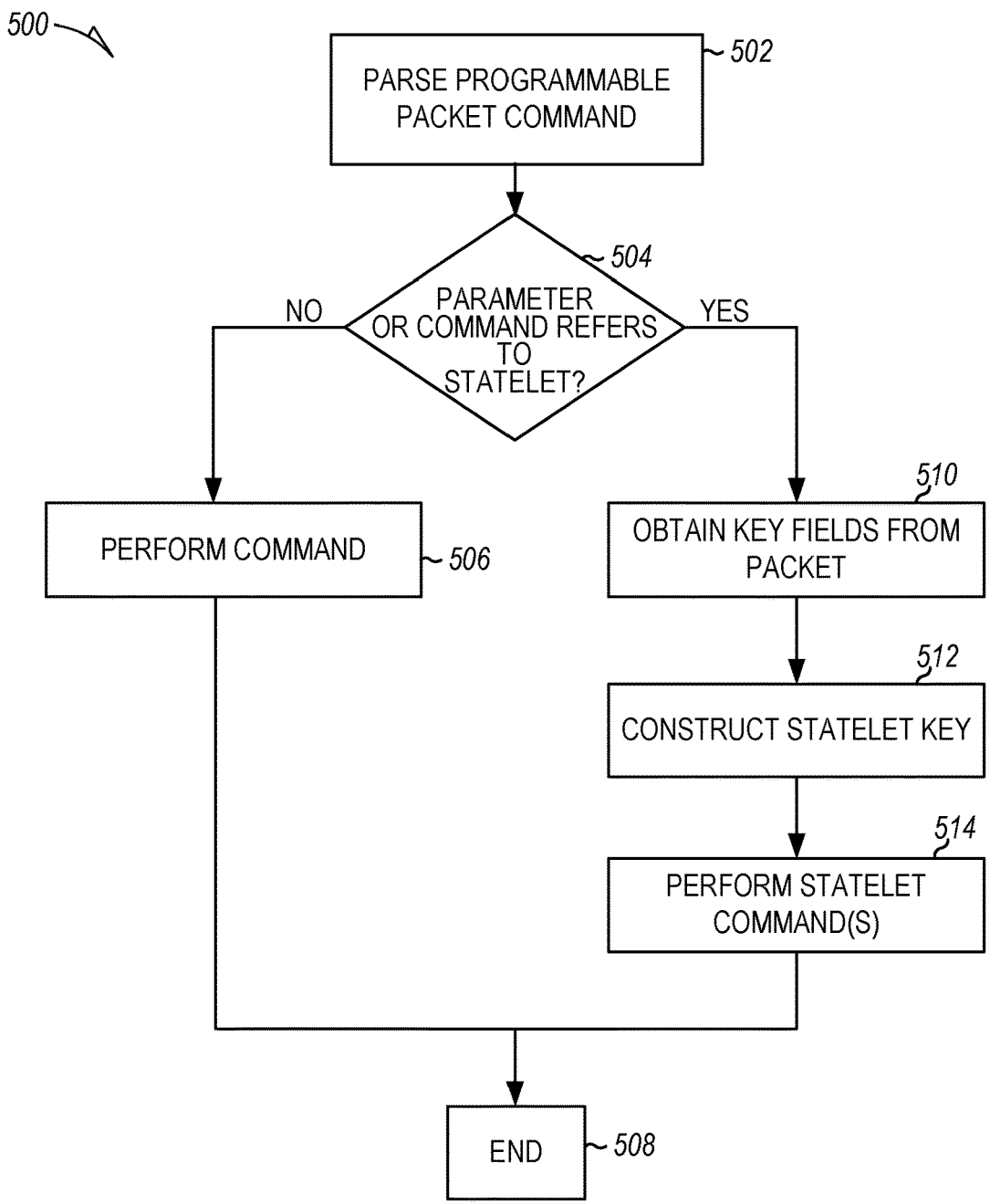
FIG. 5 is a flowchart of a method for processing a BPP command according to an example embodiment.

FIG. 5 is a flowchart of an example method 500 implemented on the execution for processing conditional commands that may include the statelet commands described in the above TABLE or other statelet commands. At operation 502, the self-driving packet module 730 parses a packet received by the node 108 or 110 and extracts a conditional command Operation 504 then determines whether the command is a statelet command (e.g., one of the statelet commands described in the above TABLE). If the command does not refer to a statelet 400, then operation 506, described in more detail below with reference to FIG. 6, executes the command and, at operation 508, the operation ends.

If, at operation 504, the method 500 determines that the command is a statelet command, it branches to operation 510 which obtains the key fields from the packet. As described above, example key fields may include a session ID, a multicast group ID, NetFlow 7-tuple, or other identifier that associates the packet with a particular session or stream. Operation 512 then constructs the Statelet Key 402 from the extracted key fields. Using the constructed Statelet Key 402, operation 514 identifies the statelet 400 in the statelet storage 107 that corresponds to the Statelet Key 402 and, at operation 514, performs the statelet command or commands on the identified statelet 400. Operation 514 is implemented in the same way as operation 506, both operations are described in more detail below with reference to FIG. 6.

Figure 6:
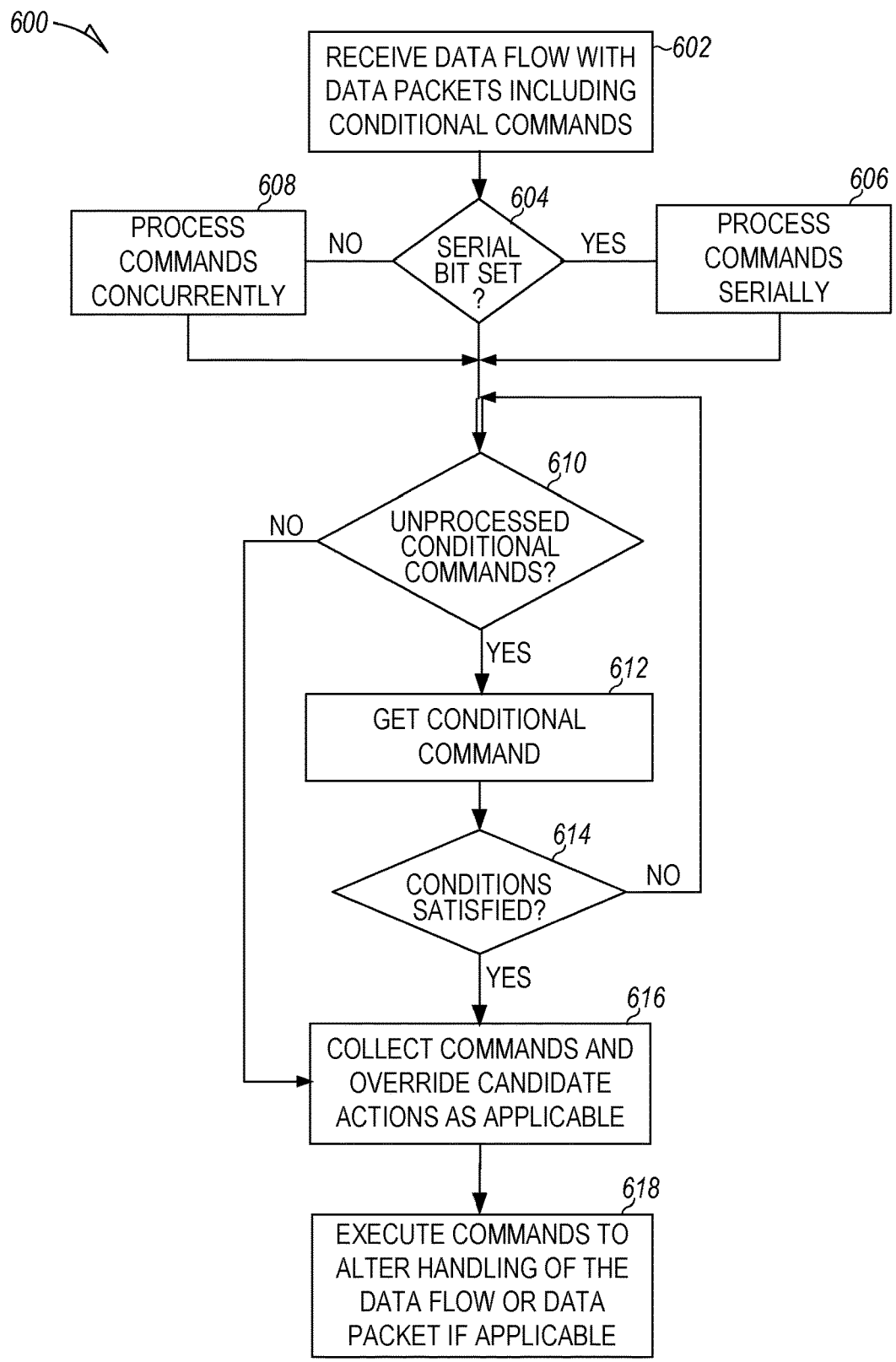
FIG. 6 is a flowchart of an example method for implementing conditional commands carried by data packets in an example embodiment.

FIG. 6 is a flowchart of an example method 600 for implementing conditional commands, including statelet commands, carried by data packets in an example embodiment. For example, method 600 may be implemented by a network device acting as an edge node 108 or internal nodes 110 routing data flows 112 and packets 102, as described above with reference to FIG. 1. Accordingly, method 600 may be employed to execute conditional commands by reading data packet headers containing a conditional command block, such as conditional command block 214. In some cases, method 600 may also communicate via BPP and hence operate on a BPP block header 212. Further, in accordance with the method 600 determines, using the serial field 310 of the command header 302, described above with reference to FIG. 3, whether the headers contain commands that may be processed in parallel rather than in series.

At operation 602, a network node 108/110 may receive a data flow 112 with data packets 102 including conditional commands. At operation 604, the method 600 checks the serial field 310 of the command header 302 to determine whether the current command of the data packet 102 has any interdependencies with another command (e.g., the serial field 310 is set). If so, operation 606 processes the commands in the sub-block serially. On the other hand, if the serial field 310 is not set, operation 608 processes the commands in the conditional command concurrently. In either case, the network node 108/110 performs packet processing, and may determine candidate actions 336 in the action set 306, such as, without limitation, creating, reading, writing, or deleting a statelet 400; updating a next hop queue; or dropping a packet. Such candidate actions include actions that the routing actions the network node 108/110 would otherwise take if no conditional command were present. Accordingly, such candidate actions may include packet handling actions that are to be applied unless conditional commands override such actions and lead to a different outcome.

At block 610, the network node 108/110 determines whether there are unprocessed conditional commands in the data packet 102. If not, the network node 108/110 may proceed to operation 616. If there are unprocessed conditional commands in the data packet 102, the node proceeds to operation 612. At operation 612, the network node 108/110 obtains the conditions and associated command(s) from the conditional command and proceeds to block 614. At block 614, the network node 108/110 determines whether the condition(s) are satisfied. If the condition(s) are not satisfied, the network node 108/110 makes no changes to the candidate actions and returns to block 610 to check for additional unprocessed conditional commands. If the condition(s) are satisfied, the network node 108/110 proceeds to block 616.

At block 616, the network node 108/110 collects commands and overrides/supplements candidate actions as applicable. Accordingly, the network node 108/110 may determine that the condition(s) are satisfied at block 614. Based on the determination that the condition(s) are satisfied, the network node 108/110 may then execute the corresponding command(s) to alter handling of the data flow 112 or to alter handling of the data packet 102 at block 618. If the conditions are not satisfied at block 614, the data packet 102 is handled based on the information in the packet header according to the candidate actions (e.g., according to general routing protocol).

Many conditional commands may be orthogonal in terms of what such commands affect (e.g., one updating flow context, another deciding packet priority). The head-end node and/or the endpoint node may select conditional commands to avoid conflicting commands that might result in undesired non-deterministic behavior.

Further, while method 600 depicts a basic processing flow that may be conducted on a network node 108/110 for any data packet 102 that arrives, various optimizations of this basic processing flow are possible. For example, such a processing flow may be optimized with regards to an order for executing commands. For example, complementary commands can be carried out immediately. Further, the sequence of execution of conditional commands can be reordered to maximize parallelization of command execution.

As a particular example, a data packet 102 might contain commands indicating how a data packet 102 should be handled when congestion is encountered at an egress interface. An application might decide that the data packet 102 is not really critical in such a case and could be dropped. In this case, the condition could be the level of utilization on the intended egress interface above a specified threshold. The corresponding action/command could then be to drop this data packet 102. A parameter could then contain the threshold level for the condition. This and many other functions can be created by employing conditional commands.

Figure 7:
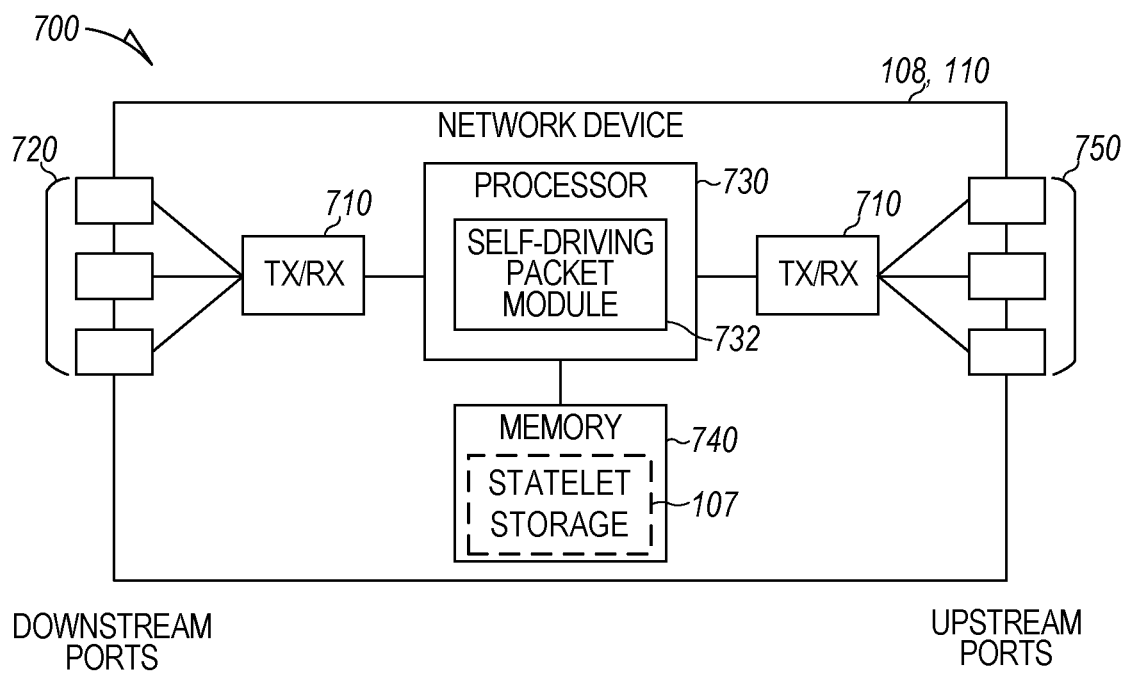
FIG. 7 is a block diagram illustrating circuitry for performing methods by a network node to process self-describing packet headers for parallel processing according to an example embodiment.

FIG. 7 is a schematic diagram of an example network device 700 for serially or concurrently executing conditional commands obtained from network packets, such as data packets 102 as part of a data flow 112 in example embodiments. For example, network device 700 may implement an edge node 108 and/or an internal node 110 in a network domain 104. Further, the network device 700 can be configured to implement method 500 and/or 600 as well as other methods/mechanisms disclosed herein. For example, the network device 700 can transmit data packets 102 with a data packet header containing a conditional command block 214. Such headers can be implemented in a BPP header 212.

Accordingly, the network device 700 may be configured to implement or support the schemes/features/methods described herein. For instance, the features/methods in the disclosure may be implemented using hardware, firmware, and/or software installed to run on hardware. One skilled in the art will recognize that the term network device encompasses a broad range of devices of which network device 700 is merely an example. Network device 700 is included for purposes of clarity of discussion but is in no way meant to limit the application of the present disclosure to a particular network device embodiment or class of network device embodiments.

The network device 700 may be a device that communicates electrical and/or optical signals through a network, e.g., a switch, router, bridge, or gateway. As shown in FIG. 7, the network device 700 may comprise transceivers (Tx/Rx) 710, which may be transmitters, receivers, or combinations thereof. A Tx/Rx 710 may be coupled to a plurality of downstream ports 720 (e.g., downstream interfaces) for transmitting and/or receiving frames from other nodes and a Tx/Rx 710 may be coupled to a plurality of upstream ports 750 (e.g., upstream interfaces) for transmitting and/or receiving frames from other nodes, respectively. A processor 730 may be coupled to the Tx/Rxs 710 to process the data signals and/or determine which network nodes 108/110 to send data signals to. The processor 730 may comprise one or more multi-core processors and/or memory devices 740, which may function as data stores, buffers, and may include the statelet storage 107. Processor 730 may be implemented as a general processor or may be part of one or more Graphics Processing Units (GPUs), Network Processor Units (NPUs), application specific integrated circuits (ASICs), and/or digital signal processors (DSPs). The network device 700 may comprise a self-driving packet module 732, which may be configured to receive and process data packets 102 as described herein. The self-driving packet module 732 can then obtain a conditional command from a data packet and determine whether a condition in the conditional command is satisfied based on packet header data, a statelet 400 for the data flow 112 stored in the statelet storage 107, and/or based on associated parameters in the conditional command Upon determining that the condition is satisfied, the self-driving packet module 732 can execute the conditional command, for example based on corresponding parameters stored in the conditional command and/or the statelet 400 for the data flow 112 stored in the statelet storage 107. Such a command may cause the self-driving packet module 732 to create, modify or delete a statelet 400 associated with the data flow 112; modify packet data; modify flow context; modify routing commands; and/or perform other actions to the data packet 102 and/or the corresponding data flow 112. In accordance with the techniques described herein, the data packet processing may be performed serially or in parallel based on the setting of the serial bit for each command as described.

The self-driving packet module 732 may be implemented in a general-purpose processor, a field programmable gate array (FPGA), an ASIC (fixed/programmable), a network processor unit (NPU), a DSP, and/or a microcontroller. In alternative embodiments, the self-driving packet module 732 may be implemented in processor 730 as commands stored in memory device 740 (e.g., as a computer program product), which may be executed by processor 730, and/or implemented in part in the processor 730 and in part in the memory device 740. The downstream ports 720 and/or upstream ports 750 may contain wireless, electrical and/or optical transmitting and/or receiving components, depending on the embodiment.

Although the example computing device is illustrated and described as a network node 108/110, the computing device may be in different forms in different embodiments. For example, the computing device may instead be a smartphone, a tablet, smartwatch, or other computing device including the same or similar elements as illustrated and described with regard to FIG. 7, above, or FIG. 8, below. Devices, such as smartphones, tablets, and smartwatches, are generally collectively referred to as mobile devices or user equipment. Further, although the various data storage elements are illustrated as part of the network node 700, the storage may also or alternatively include cloud-based storage accessible via a network, such as the Internet or server-based storage.

Memory 740 may include volatile memory and/or non-volatile memory. Network node 700 may include—or have access to a computing environment that includes—a variety of computer-readable media, such as volatile memory and non-volatile memory, removable storage devices and non-removable storage devices. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

The network node 700 may include or have access to a computing environment that includes an input interface, an output interface, and a communication interface. The output interface may include a display device, such as a touchscreen, that also may serve as an input device. The input interface may include one or more of a touchscreen, touchpad, mouse, keyboard, camera, one or more device-specific buttons, one or more sensors integrated within or coupled via wired or wireless data connections to the network node 700, and/or other input devices. The network node 700 may operate in a networked environment using a communication connection to connect to one or more remote computers, such as database servers. The remote computer may include a personal computer (PC), server, router, network PC, a peer device or other common DFD network switch, or the like. The communication connection may include a Local Area Network (LAN), a Wide Area Network (WAN), cellular, Wi-Fi, Bluetooth, or other networks.

Computer-readable instructions stored on a computer-readable medium are executable by the processor 730 of the network node 700, such as the self-driving packet module 732. The self-driving packet module 732 in some embodiments comprises software that, when executed by the processor 730 performs network switch operations according to the serial and/or parallel processing of the conditional commands as described herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN).

Figure 8:
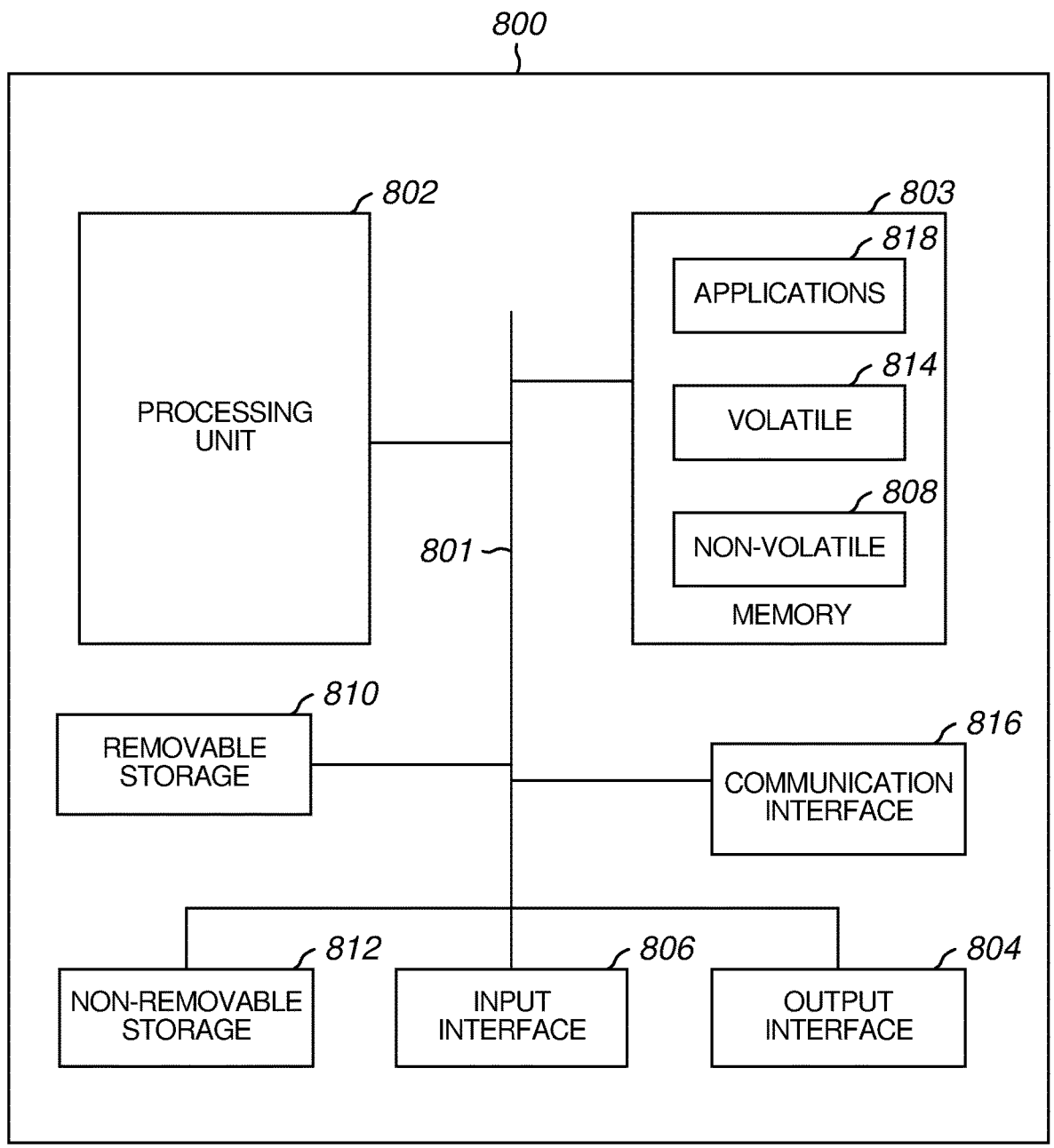
FIG. 8 is a block diagram illustrating circuitry for clients, servers, network-connected resources for implementing algorithms and performing methods, according to example embodiments.

FIG. 8 is a block diagram illustrating circuitry for computing devices 106 (e.g., clients, servers, or network cloud-based resources) for implementing algorithms and performing methods according to example embodiments. All components need not be used in various embodiments. For example, the clients, servers, and network resources may each use a different set of components, or in the case of servers, for example, larger storage devices.

One example computing device in the form of a computer 800 may include a processing unit 802, memory 803, removable storage 810, and non-removable storage 812. Although the example computing device is illustrated and described as computer 800, the computing device may be in different forms in different embodiments. For example, the computing device may instead be a smartphone, a tablet, smartwatch, or other computing device including the same or similar elements as illustrated and described with regard to FIG. 7. Devices, such as smartphones, tablets, and smartwatches, are generally collectively referred to as mobile devices or user equipment. Further, although the various data storage elements are illustrated as part of the computer 800, the storage 810 may also or alternatively include cloud-based storage accessible via a network 104, such as the Internet, or server-based storage.

Memory 803 may include volatile memory 814 and non-volatile memory 808. Computer 800 may include—or have access to a computing environment that includes—a variety of computer-readable media, such as volatile memory 814 and non-volatile memory 808, removable storage 810 and non-removable storage 812. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

Computer 800 may include or have access to a computing environment that includes input interface 806, output interface 804, and a communication interface 816. Output interface 804 may provide an interface to a display device, such as a touchscreen, that also may serve as an input device. The input interface 806 may provide an interface to one or more of a touchscreen, touchpad, mouse, keyboard, camera, one or more device-specific buttons, one or more sensors integrated within or coupled via wired or wireless data connections to the computer 800, and/or other input devices. The computer 800 may operate in a networked environment using a communication connection to connect to one or more remote computers, such as database servers. The remote computer may include a personal computer (PC), server, router, network PC, a peer device or other common network node, or the like. The communication connection may include a local area network (LAN), a wide area network (WAN), cellular, Wi-Fi, Bluetooth, or other networks 208.

Computer-readable instructions stored on a computer-readable medium are executable by the processing unit 802 of the computer 800. A hard drive, CD-ROM, RAM, and flash memory are some examples of articles including a non-transitory computer-readable medium such as a storage device. The terms computer-readable medium and storage device do not include carrier waves to the extent carrier waves are deemed too transitory.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A computer-implemented method for processing a data flow in a network device associated with a statelet storage, the method comprising:
   parsing a first packet of the data flow, the first packet including a first header, and extracting a first conditional command and flow information from the first header, the flow information identifying the data flow;
   generating a first statelet key from the flow information; and
   executing the first conditional command to access a first statelet associated with the first statelet key, the first statelet being stored in the statelet storage of the network device.

2. The computer-implemented method of claim 1, further comprising:
   storing a first freshness value in a freshness field of the first statelet, the first freshness value indicating a creation time at which the first statelet is created;
   parsing a second packet of the data flow to extract a second command and the flow information identifying the data flow from a second header of the second packet;
   generating the first statelet key from the flow information extracted from the second header of the second packet;
   responsive to the second command, accessing the first statelet having the first statelet key including at least one of: reading a field value from the first statelet, writing the field value to the first statelet, modifying the field value in a field of the first statelet, adding a first list value to a list in the first statelet, or removing a second list value from the list in the first statelet; and
   storing a second freshness value in the freshness field of the first statelet, the second freshness value indicating an accessed time at which the first statelet is accessed responsive to the second command.

3. The computer-implemented method of claim 2, wherein:
   the accessing of the first statelet responsive to the second command includes reading the field value from the first statelet; and
   the computer-implemented method further comprises controlling processing of the second packet by the network device responsive to the field value read from the first statelet.

4. The computer-implemented method of claim 1, wherein executing of the first conditional command comprises:
   creating the first statelet in the statelet storage of the network device, the first statelet having a key field including the first statelet key; and
   storing a first freshness value in a freshness field of the first statelet, the first freshness value indicating a creation time at which the first statelet is created.

5. The computer-implemented method of claim 4 wherein the statelet storage includes a plurality of statelets and the method further comprises:
- comparing, by the network device, respective freshness values in freshness fields of each of the plurality of statelets to a current time value; and
- responsive to a difference between the current time value and the freshness value in the freshness field of one statelet of the plurality of statelets being greater than a threshold value, reclaiming memory occupied by the one statelet.

6. The computer-implemented method of claim 1, wherein the executing of the first conditional command to access the first statelet writes a data value into a field of the first statelet responsive to metadata in the first header of the first packet.

7. The computer-implemented method of claim 1, wherein the executing of the first conditional command to access the first statelet includes incrementing a value in a field of the first statelet.

8. The computer-implemented method of claim 1, wherein the executing of the first conditional command includes deleting the first statelet from the statelet storage of the network device.

9. The computer-implemented method of claim 1, wherein:
- generating the first statelet key includes combining N values from the flow information; and
- executing the first command to access the first statelet associated with the first statelet key includes selecting the first statelet responsive to the first statelet key of the first statelet including M values of the N values in the first statelet key, where M is less than N.

10. The computer-implemented method of claim 9, wherein the first conditional command includes a statelet key mask and the selecting of the first statelet includes selecting the M values in the first statelet key responsive to the statelet key mask.

11. The computer-implemented method of claim 1, wherein:
- the parsing the first packet includes the extracting the first conditional command and a second command from the first header of the first packet;
- the executing the first conditional command includes testing a condition to produce a result based on data in the first statelet; and
- the computer-implemented method further comprises conditionally executing the second command responsive to the result produced by the first conditional command.

12. An apparatus for use in a network device, the apparatus comprising:
- a memory including statelet storage and storing instructions; and
- at least one processor in communication with the memory, the at least one processor configured, upon execution of the instructions, to perform the following steps:
  - parse a first packet of a data flow, the first packet including a first header, and extract a first conditional command and flow information from the first header, the flow information identifying the data flow;
  - generate a first statelet key from the flow information; and
  - execute the first conditional command to access a first statelet associated with the first statelet key, the first statelet being stored in the statelet storage.

13. The apparatus of claim 12, wherein the at least one processor further executes the instructions to:
- create the first statelet in the statelet storage of the network device, the first statelet having a key field including the first statelet key; and
- store a first freshness value in a freshness field of the first statelet, the first freshness value indicating a creation time at which the first statelet is created.

14. The apparatus of claim 13, wherein the at least one processor further executes the instructions to:
- parse a second packet of the data flow to extract a second command, the flow information identifying the data flow from a second header of the second packet;
- generate the first statelet key from the flow information extracted from the second header of the second packet;
- access the first statelet;
- execute the second command to perform at least one of: read a field value from the first statelet, write the field value to the first statelet, modify the field value in a field of the first statelet, add a first value to a list in the first statelet, or remove a second value from the list in the first statelet; and
- store a second freshness value in the freshness field of the first statelet, the second freshness value indicating an accessed time at which the first statelet is accessed responsive to the second command.

15. The apparatus of claim 12, wherein the at least one processor further executes the instructions to write a data value into a field of the first statelet responsive to metadata in a header of the first packet.

16. The apparatus of claim 12, wherein the the at least one processor further executes the instructions to execute the first conditional command including deleting the first statelet from the statelet storage of the network device.

17. The apparatus of claim 12, wherein:
- the generating the first statelet key includes combining N values from the flow information; and
- the executing the first conditional command to access the first statelet associated with the first statelet key includes selecting the first statelet responsive to at statelet key of the first statelet including M values of the N values in the first statelet key, where M is less than N.

18. The apparatus of claim 17, wherein the first conditional command includes a statelet key mask and the selecting the first statelet includes selecting the M values responsive to the statelet key mask.

19. The apparatus of claim 12, wherein:
- the parsing the first packet includes extracting the first conditional command and a second command from the first header of the first packet;
- the executing the first conditional command includes testing a condition to produce a result based on data in the first statelet; and
- wherein the at least one processor further executes the instructions to conditionally execute the second command responsive to the result produced by the first conditional command.

20. A non-transitory computer-readable medium storing computer instructions for processing a data flow in a network device, that configure at least one processor, upon execution of the instructions to perform the following steps:
- parse a first packet of the data flow, the first packet including a first header, and extract a first conditional command and flow information from the first header, the flow information identifying the data flow;
- generate a first statelet key from the flow information; and execute the first conditional command to access a first statelet associated with the first statelet key, the first statelet being stored in a statelet storage associated with the network device.

* * * * *